United States Patent
Nguyen et al.

(10) Patent No.: US 8,584,754 B1
(45) Date of Patent: Nov. 19, 2013

(54) DELAYED-TACKIFIER COATED PARTICULATES AND METHODS RELATING THERETO

(71) Applicant: Halliburton Energy Services, Inc., Houston, TX (US)

(72) Inventors: Philip D. Nguyen, Houston, TX (US); Loan K. Vo, Houston, TX (US); Feng Liang, Houston, TX (US); Jimmie D. Weaver, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/780,266

(22) Filed: Feb. 28, 2013

(51) Int. Cl.
*E21B 43/04* (2006.01)
*E21B 33/13* (2006.01)

(52) U.S. Cl.
USPC ......... 166/278; 166/276; 166/280.1; 166/300

(58) Field of Classification Search
None
See application file for complete search history.

(56) References Cited

U.S. PATENT DOCUMENTS

| | | | |
|---|---|---|---|
| 5,358,560 A * | 10/1994 | Hitch et al. | 106/499 |
| 7,607,966 B1 | 10/2009 | Fox | |
| 2006/0260808 A1 | 11/2006 | Weaver et al. | |
| 2007/0039733 A1 | 2/2007 | Welton et al. | |
| 2007/0042912 A1 * | 2/2007 | Welton et al. | 507/203 |
| 2012/0178652 A1 | 7/2012 | Welton et al. | |

* cited by examiner

*Primary Examiner* — Zakiya W Bates
(74) *Attorney, Agent, or Firm* — Robert A. Kent; McDermott Will & Emery LLP

(57) ABSTRACT

Delayed-tackifier coated particulates and treatment fluids comprising delayed-tackifier coated particulates wherein the tackifier is associated with a surfactant. The treatment fluids may be used in methods that include providing a treatment fluid that comprises an aqueous base fluid and a delayed-tackifier coated particulate and introducing that treatment fluid into a wellbore penetrating a subterranean formation. Once within the formation, forming a particulate pack, wherein the particulate pack is a gravel pack along a portion of the wellbore, a proppant pack within a portion of the subterranean formation, or both.

17 Claims, No Drawings

DELAYED-TACKIFIER COATED PARTICULATES AND METHODS RELATING THERETO

BACKGROUND

The present invention relates to delayed-tackifier coated particulates and methods relating thereto.

Particulate packs are often used in wellbore operations to enhance the flow of fluids while mitigating the flow of particulates (e.g., formation fines and particulates from the pack). To further aid in the mitigation of particulate migration, the particulates of the particulate packs are often coated with tackifiers that allow for migrating particulates to stick thereto. As used herein the term "tackifier" generally refers to a chemical or polymer capable of forming a nonhardening coating on a surface of a particulate (e.g., formation fines, proppant particulates, and gravel particulates).

Generally, traditional tackifiers are sticky to the touch, which often causes the coated particulates to accumulate on surfaces of wellbore tools (e.g., pumps, pipes, sand screws, and the like). Cleaning the wellbore tools can often be a time-consuming undertaking that may involve the use of expensive chemicals. In some instances, if the accumulation of particles is too high, the wellbore tools may be damaged and need repair or replacement. For example, operating equipment may jam resulting from buildup of coated proppant during the fracturing treatment, causing delay of proppant transport and potentially shut down of the operation.

Additionally, in deviated wellbores, the accumulation of tacky particulates can be especially problematic because particulate settling is magnified across the wellbore radius as compared to along the wellbore length. As the particles settle, the tackifier can cause the particles to accumulate into larger masses that can eventually cause the pressure in the wellbore to increase, which can lead to costly formation damage. In horizontal well gravel packing or multi-stage fracturing treatments, settled sand or proppant forms dunes in the wellbore which may lead to premature screenout. The remediation of accumulated particulates in a deviated wellbore may be especially time-consuming and costly.

SUMMARY OF THE INVENTION

The present invention relates to delayed-tackifier coated particulates and methods relating thereto.

In one embodiment, a method may include providing a treatment fluid that comprises an aqueous base fluid and a delayed-tackifier coated particulate, the delayed-tackifier coated particulate comprising a particulate coated with a tackifier that is associated with a surfactant; introducing the treatment fluid into a wellbore penetrating a subterranean formation; and forming a particulate pack in at least one selected from the group consisting of the wellbore, the subterranean formation, and any combination thereof.

In another embodiment, a method may include forming a delayed-tackifier coated particulate by dry-coating a particulate with a tackifier and a surfactant simultaneously; producing a treatment fluid that comprises an aqueous base fluid and the delayed-tackifier coated particulate; introducing the treatment fluid into a deviated wellbore penetrating a subterranean formation; and forming a particulate pack in at least one selected from the group consisting of the deviated wellbore, the subterranean formation, and any combination thereof.

In yet another embodiment, a treatment fluid may include an aqueous base fluid; and a plurality of delayed-tackifier coated particulates that comprises a particulate coated with a tackifier that is associated with a surfactant, the surfactant comprising at least one functional group selected from one consisting of an ester, a phosphate ester, an amide, an acetal, a ketal, an orthoester, a carbonate, an anhydride, a silyl ether, an alkene oxide, an ether, an imine, an ether ester, an ester amide, an ester urethane, a carbonate urethane, an amino acid, any derivative thereof, and any combination thereof.

The features and advantages of the present invention will be readily apparent to those skilled in the art upon a reading of the description of the preferred embodiments that follows.

DETAILED DESCRIPTION

The present invention relates to delayed-tackifier coated particulates and methods relating thereto.

Of the many advantages of the delayed-tackifier coated particulates described herein, the particulates begin as minimally sticky to the touch and over time increase in stickiness. As a consequence, the delayed-tackifier coated particulates may advantageously stick to wellbore tools to a lesser degree than traditional tackifiers that are sticky from the onset. Mitigating the accumulation of tackifiers and particulates on surface equipment (e.g., sand screw, blender tub, pump, tubing, and the like) and wellbore tools (e.g., packer, screen-wellbore wall annulus, coiled tubing, and the like) reduces the cost and use of chemicals associated with cleanup.

Further, the delayed-tackifier coated particulates described herein may mitigate particulate agglomeration until the particulates are properly placed in a pack (e.g., a gravel pack or a proppant pack). Reducing downhole agglomeration of particulates increases the efficacy of individual wellbore treatments and minimizes the need for remedial operations, thereby saving time and money.

It should be understood that the term "particulate," as used in this disclosure, includes all known shapes of materials, including substantially spherical materials, fibrous materials, polygonal materials (such as cubic materials), and combinations thereof.

As used herein, the term "coating," and the like, does not imply any particular degree of coating on a particulate. In particular, the terms "coat" or "coating" do not imply 100% coverage by the coating on a particulate.

It should be noted that when "about" is provided herein at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

Delayed-tackifier coated particulates described herein generally comprise particulates coated with a tackifier that is associated with a surfactant. Without being limited by theory, it is believed that the tail groups of the surfactant associate with the tackifier coated on the particulates, so as to further modify the surface and reduce, or turn-off, the tackiness of the tackifier temporally. Because the surfactant has some solubility in water, it will slowly dissociate from the particulates, e.g., when broken gel or formation water flows over the particles. Dissociation of the surfactant will reveal the tackifier, thereby yielding a sticky particulate. As described further herein, the surfactant can also be degradable, which may provide for tailoring the time frame of the delayed tackiness. In this case, the dissociation of the surfactant does not depend on the water/aqueous media flow back.

One example of a tackifier suitable for use in conjunction with the delayed-tackifier coated particulates is a condensation reaction product comprised of a commercially available polyacid and a polyamine. Such commercial products include compounds such as combinations of dimer acids containing some trimer and higher oligomers and also small amounts of monomer acids that are reacted with polyamines. Other polyacids include trimer acids, synthetic acids produced from fatty acids, maleic anhydride, acrylic acid, and the like. Combinations of these may be suitable as well.

Additional tackifiers which may be used in conjunction with the delayed-tackifier coated particulates include liquids and solutions of, for example, polyesters, polycarbonates, silyl-modified polyamide compounds, polycarbamates, urethanes, natural resins such as shellac, and the like. Combinations of these may be suitable as well.

Other suitable tackifiers for use in conjunction with the delayed-tackifier coated particulates are described in U.S. Pat. Nos. 5,853,048 and 5,833,000, both issued to Weaver, et al., and U.S. Patent Publication Nos. 2007/0131425 and 2007/0131422, the entire disclosures of which are herein incorporated by reference.

In some embodiments, suitable surfactants for use in conjunction with the delayed-tackifier coated particulates may include cationic or nonionic surfactants.

Examples of suitable cationic surfactants may include, but are not limited to, dialkyl dihydrogenated tallow ammonium surfactants, alkyl trimethyl ammonium surfactants (e.g., dodecyltrimethyl ammonium surfactant, myristyltrimethyl ammonium surfactant, decyltrimethyl ammonium surfactant, hexadecyltrimethyl ammonium surfactant, cetyltrimethyl ammonium surfactant, dodecyltrimethyl ammonium surfactant), dialkyl dimethyl ammonium surfactants (e.g., ethylhexadecyldimethyl ammonium surfactant and didodecyldimethyl ammonium surfactant), dialkyl diethyl ammonium surfactants (e.g., bis-decyl-diethyl ammonium surfactants), stearamidopropyl dimethyl benzalkonium surfactant and the like, with any suitable counter ion (e.g., chlorine, bromine, and methyl sulfate), and any combination thereof.

Examples of suitable nonionic surfactants may include, but are not limited to, alcohol oxyalkylates, alkyl phenol oxyalkylates, sorbitan esters, alkoxylates of sorbitan esters, castor oil alkoxylates, fatty acid alkoxylates, lauryl alcohol alkoxylates (e.g., lauryl alcohol ethoxylate), nonylphenol alkoxylates, octylphenol alkoxylates, tridecyl alcohol alkoxylates, polyoxyethylene ("POE")-10 nonylphenol ethoxylate, POE-100 nonylphenol ethoxylate, POE-12 nonylphenol ethoxylate, POE-12 octylphenol ethoxylate, POE-12 tridecyl alcohol ethoxylate, POE-14 nonylphenol ethoxylate, POE-15 nonylphenol ethoxylate, POE-18 tridecyl alcohol ethoxylate, POE-20 nonylphenol ethoxylate, POE-20° leyl alcohol ethoxylate, POE-20 stearic acid ethoxylate, POE-3 tridecyl alcohol ethoxylate, POE-30 nonylphenol ethoxylate, POE-30 octylphenol ethoxylate, POE-34 nonylphenol ethoxylate, POE-4 nonylphenol ethoxylate, POE-40 castor oil ethoxylate, POE-40 nonylphenol ethoxylate, POE-40 octylphenol ethoxylate, POE-50 nonylphenol ethoxylate, POE-50 tridecyl alcohol ethoxylate, POE-6 nonylphenol ethoxylate, POE-6 tridecyl alcohol ethoxylate, POE-8 nonylphenol ethoxylate, POE-9 octylphenol ethoxylate, mannide monooleate, sorbitan isostearate, sorbitan laurate, sorbitan monoisostearate, sorbitan monolaurate, sorbitan monooleate, sorbitan monopalmitate, sorbitan monostearate, sorbitan oleate, sorbitan palmitate, sorbitan sesquioleate, sorbitan stearate, sorbitan trioleate, sorbitan tristearate, POE-20 sorbitan monoisostearate ethoxylate, POE-20 sorbitan monolaurate ethoxylate, POE-20 sorbitan monooleate ethoxylate, POE-20 sorbitan monopalmitate ethoxylate, POE-20 sorbitan monostearate ethoxylate, POE-20 sorbitan trioleate ethoxylate, POE-20 sorbitan tristearate ethoxylate, POE-30 sorbitan tetraoleate ethoxylate, POE-40 sorbitan tetraoleate ethoxylate, POE-6 sorbitan hexastearate ethoxylate, POE-6 sorbitan monostearate ethoxylate, POE-6 sorbitan tetraoleate ethoxylate, POE-60 sorbitan tetrastearate ethoxylate, and the like, and any combination thereof.

In some embodiments, the surfactant for use in conjunction with the delayed-tackifier coated particulates may be degradable. For example, the surfactant may comprise at least one functional group selected from one of an ester, a phosphate ester, an amide, an acetal, a ketal, an orthoester, a carbonate, an anhydride, a silyl ether, an alkene oxide, an ether, an imine, an ether ester, an ester amide, an ester urethane, a carbonate urethane, an amino acid, and the like, any derivative thereof, and any combination thereof. The choice of the degradable group may be determined by pHs and temperatures, the details of which are available in known literature sources. Examples of degradable surfactants may include, but are not limited to, propalalkonium based amides, AMMONYX® SDBC (a stearamidopropalkonium chloride, available from Stepan Company), and the like, and any combination thereof.

Examples of particulates for use in conjunction with the delayed-tackifier coated particulates may include, but are not limited to, gravel particulates, proppants, and the like, and any combination thereof.

Suitable proppants for use in conjunction with the present invention may be any material suitable for use in subterranean operations. Examples of these particulates may include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, metasilicate, calcium silicate, kaolin, talc, zirconia, boron, fly ash, hollow glass microspheres, solid glass, and combinations thereof. The mean particulate size generally may range from about 2 mesh to about 400 mesh on the U.S. Sieve Series; however, in certain circumstances, other mean particulate sizes may be desired and will be entirely suitable for practice of the present invention. In particular embodiments, preferred mean particulates size distribution ranges are one or more of 6/12, 8/16, 12/20, 16/30, 20/40, 30/50, 40/60, 40/70, or 50/70 mesh. Moreover, fibrous materials, that may or may not be used to bear the pressure of a closed fracture, may be included in certain embodiments of the present invention.

In some embodiments, treatment fluids may comprise aqueous base fluids and delayed-tackifier coated particulates. In some embodiments, the delayed-tackifier coated particulates may be present in a treatment fluid at a concentration ranging from a lower limit of about 0.25 pounds per gallon ("ppg"), 0.5 ppg, 1 ppg, or 5 ppg to an upper limit of about 30 ppg, 20 ppg, or 10 ppg by volume of the treatment fluid, wherein the concentration of the delayed-tackifier coated particulates may range from any lower limit to any upper limit and encompass any range therebetween.

Aqueous base fluids suitable for use in conjunction with the present invention may comprise fresh water, saltwater (e.g., water containing one or more salts dissolved therein), brine (e.g., saturated salt water or produced water), seawater, produced water (e.g., water produced from a subterranean formation), aqueous-miscible fluids, and any combination thereof. Generally, the water may be from any source, provided that it does not contain components that might adversely affect the stability and/or performance of the first treatment fluids or second treatment fluids of the present invention. In certain embodiments, the density of the aqueous base fluid can be adjusted, among other purposes, to provide additional particulate transport and suspension in the treatment fluids used in the methods of the present invention. In certain embodiments, the pH of the aqueous base fluid may be adjusted (e.g., by a buffer or other pH adjusting agent), among other purposes, to activate a crosslinking agent and/or to reduce the viscosity of the first treatment fluid (e.g., activate a breaker, deactivate a crosslinking agent). In these embodiments, the pH may be adjusted to a specific level, which may depend on, among other factors, the types of gelling agents, acids, and other additives included in the treatment fluid. One of ordinary skill in the art, with the benefit of this disclosure, will recognize when such density and/or pH adjustments are appropriate.

Suitable aqueous-miscible fluids may include, but not be limited to, alcohols, e.g., methanol, ethanol, n-propanol, isopropanol, n-butanol, sec-butanol, isobutanol, and t-butanol; glycerins; glycols, e.g., polyglycols, propylene glycol, and ethylene glycol; polyglycol amines; polyols; any derivative thereof; any in combination with salts, e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate; any in combination with an aqueous-based fluid, and any combination thereof.

In some embodiments, the aqueous base fluid may be foamed. In some embodiments a treatment fluid for use in conjunction with the present invention may comprise an aqueous base fluid, a gas, a foaming agent, and delayed-tackifier coated particulates.

In some embodiments, the gas is selected from the group consisting of nitrogen, carbon dioxide, air, methane, helium, argon, and any combination thereof. One skilled in the art, with the benefit of this disclosure, should understand the benefit of each gas. By way of nonlimiting example, carbon dioxide foams may have deeper well capability than nitrogen foams because carbon dioxide emulsions have greater density than nitrogen gas foams so that the surface pumping pressure required to reach a corresponding depth is lower with carbon dioxide than with nitrogen.

In some embodiments, the quality of the foamed treatment fluid may range from a lower limit of about 5%, 10%, 25%, 40%, 50%, 60%, or 70% gas volume to an upper limit of about 95%, 90%, 80%, 75%, 60%, or 50% gas volume, and wherein the quality of the foamed treatment fluid may range from any lower limit to any upper limit and encompass any subset therebetween. Most preferably, the foamed treatment fluid may have a foam quality from about 85% to about 95%, or about 90% to about 95%.

Suitable foaming agents for use in conjunction with the present invention may include, but are not limited to, cationic foaming agents, anionic foaming agents, amphoteric foaming agents, nonionic foaming agents, or any combination thereof. Nonlimiting examples of suitable foaming agents may include, but are not limited to, surfactants like betaines, sulfated or sulfonated alkoxylates, alkyl quaternary amines, alkoxylated linear alcohols, alkyl sulfonates, alkyl aryl sulfonates, $C_{10}$-$C_{20}$ alkyldiphenyl ether sulfonates, polyethylene glycols, ethers of alkylated phenol, sodium dodecylsulfate, alpha olefin sulfonates such as sodium dodecane sulfonate, trimethyl hexadecyl ammonium bromide, and the like, any derivative thereof, or any combination thereof. Foaming agents may be included in foamed treatment fluids at concentrations ranging typically from about 0.05% to about 2% of the liquid component by weight (e.g., from about 0.5 to about 20 gallons per 1000 gallons of liquid).

In some embodiments, treatment fluids described herein may further comprise additives. Suitable additives may include, but are not limited to, salts, weighting agents, inert solids, fluid loss control agents, emulsifiers, dispersion aids, corrosion inhibitors, emulsion thinners, emulsion thickeners, viscosifying agents, gelling agents, lost circulation materials, pH control additives, breakers, biocides, crosslinkers, stabilizers, chelating agents, scale inhibitors, gas hydrate inhibitors, mutual solvents, oxidizers, reducers, friction reducers, clay stabilizing agents, or any combination thereof. One skilled in the art with the benefit of this disclosure should understand the appropriate additives and concentrations thereof for use in conjunction with the present invention to achieve the desired result and so as to maintain operability of the methods of the present invention.

Forming the delayed-tackifier coated particulates described herein may be achieve by dry-coating particulates with a tackifier and a surfactant simultaneously, dry-coating particulates with a tackifier and then wet-coating with a surfactant (i.e., adding the tackifier coated particles to a fluid and then adding the surfactant), wet-coating particulates with a tackifier and a surfactant simultaneously, or wet-coating particulates with a tackifier and then wet-coating with a surfactant.

Some embodiments may involve using the delayed-tackifier coated particulates described herein in fracturing operation, which may involve (1) optionally introducing a prepad fluid into the subterranean formation, (2) introducing a pad fluid into the subterranean formation, (3) introducing a proppant slurry into the subterranean formation so as to form a proppant pack in the subterranean formation, and (4) optionally introducing a flush fluid into the subterranean formation. Prepad fluids are generally introduced at or below matrix pressure and before pad fluids. Pad fluids are generally introduced above matrix pressure (i.e., at a pressure sufficient to create or extend at least one fracture in the subterranean formation). In some embodiments, proppant slurries may comprise the delayed-tackifier coated particulates.

Some embodiments may involve using the delayed-tackifier coated particulates described herein in gravel packing operations, which may involve forming a gravel pack in a wellbore with a plurality of delayed-tackifier coated particulates.

In some embodiments, tackiness of the delayed-tackifier coated particulates may be activated or regained by the surfactant dissociating from the delayed-tackifier coated particulates. In some instances, dissociation may be facilitated by a flow-back fluid (e.g., a formation fluid or wellbore fluid flowing back towards the wellbore).

In some embodiments, tackiness of the delayed-tackifier coated particulates may be activated by contacting the delayed-tackifier coated particulates with a fluid that accelerates the dissociation of the surfactant from the delayed-tackifier coated particulates and/or accelerates the degradation of the surfactant of the delayed-tackifier coated particulates. For example, fluids that change the local pH around the delayed-tackifier coated particulates that comprise surfactants comprising hydrolysable functional groups (e.g., an ester, a phosphate ester, an amide, an orthoester, an anhydride, an ether ester, an ester amide, and the like) may advantageously increase the rate of degradation of the surfactant.

In some embodiments, tackiness of the delayed-tackifier coated particulates may be activated by elevated temperature and/or a pH change, which may or may not involve another fluid. For example, the increased temperature in the subterranean formation may accelerate degradation of some degradable surfactants.

The methods and compositions described herein may be used in full-scale operations or pills. As used herein, a "pill" is a type of relatively small volume of specially prepared treatment fluid placed or circulated in the wellbore.

Some embodiments of the present invention may involve producing hydrocarbon fluids from the portion of the subterranean formation having been treated with the delayed-tackifier coated particulates described herein.

While the methods and compositions provided herein are applicable to wellbores at any angle including, but not limited to, vertical wellbores, deviated wellbores, highly deviated wellbores, horizontal wellbores, and hybrid wellbores comprising sections of any combination of the aforementioned wells, the delayed-tackifier coated particulates and associated methods may be especially effective in deviated wellbores, highly deviated wellbores, horizontal wellbores, and hybrid wellbores where particulate accumulation is of a greater concern. As used herein, the term "deviated wellbore" refers to a wellbore in which any portion of the well is oriented between about 55-degrees and about 125-degrees from a vertical inclination. As used herein, the term "highly deviated wellbore" refers to a wellbore that is oriented between about 75-degrees and about 105-degrees off-vertical.

To facilitate a better understanding of the present invention, the following examples of preferred embodiments are given. In no way should the following examples be read to limit, or to define, the scope of the invention.

EXAMPLES

Example 1

In a 200 mL glass jar, 100 mL of tap water, 50 g of 20/40 Brady sand, and 2 mL of SANDWEDGE® WF (a tackifier, commercially available from Halliburton Energy Services, Inc.) were mixed by shaking vigorously. After shaking, the sand had agglomerated together.

Example 2

In a 200 mL glass jar, 100 mL of tap water, 0.5 mL of AMMONYX® SDBC (a cationic surfactant), 50 g of 20/40 Brady sand, and 2 mL of SANDWEDGE® WF (a tackifier, commercially available from Halliburton Energy Services, Inc.) were mixed by shaking vigorously. After shaking, the sand remained free-flowing and unagglomerated. The sand was then washed twice by decanting the supernatant, adding 100 mL of tap water, and shaking the jar vigorously. After washing, the sand particles became tacky and agglomerated together.

Example 3

In a 200 mL glass jar, 100 mL of tap water, 50 g of 20/40 Brady sand, and 2 mL of SANDWEDGE® WF (a tackifier, commercially available from Halliburton Energy Services, Inc.) were mixed by shaking vigorously. After shaking, the sand had agglomerated together. Then, 0.5 mL of AMMONYX® SDBC was added and the jar shaken vigorously, after which the sand was free-flowing. The sand was then washed twice by decanting the supernatant, adding 100 mL of tap water, and shaking the jar vigorously. After washing, the sand particles were again tacky and agglomerated together.

Embodiments disclosed herein include:

A. Methods comprising introducing a treatment fluid into a wellbore penetrating a subterranean formation wherein the treatment fluid comprises an aqueous base fluid and a delayed-tackifier coated particulate, the delayed-tackifier coated particulate comprising a particulate coated with a tackifier that is associated with a surfactant. As the treatment fluid is introduced, it forms a gravel pack along a portion of the wellbore, a proppant pack within a portion of the subterranean formation, or both (a frac-pack).

B. Methods comprising first producing a delayed-tackifier coated particulate by dry-coating a particulate with a tackifier and a surfactant simultaneously and then producing a treatment fluid that comprises an aqueous base fluid and the delayed-tackifier coated particulate. The treatment fluid is then introduced into a wellbore penetrating a subterranean formation such that a particulate pack is formed. The particulate pack may be a gravel pack along a portion of the wellbore, a proppant pack within a portion of the subterranean formation, or both (a frac-pack).

C. A treatment fluid comprising an aqueous base fluid and a plurality of delayed-tackifier coated particulates. The delayed-tackifier coated particulates comprise a particulate coated with a tackifier that is associated with a surfactant. The surfactant itself comprises at least one functional group selected from one consisting of an ester, a phosphate ester, an amide, an acetal, a ketal, an orthoester, a carbonate, an anhydride, a silyl ether, an alkene oxide, an ether, an imine, an ether ester, an ester amide, an ester urethane, a carbonate urethane, an amino acid, any derivative thereof, and any combination thereof.

Each of embodiments A, B, and C may have one or more of the following additional elements in any combination:

Element 1: the surfactant may be cationic, nonionic or a combination thereof.

Element 2: the surfactant may be degradable.

Element 3: the delayed-tackifier coated particulate may be present in an amount ranging from about 0.25 pounds per gallon to about 30 pounds per gallon of the treatment fluid.

Element 4: the treatment fluid may be foamed.

Element 5: the treatment fluid may further comprise at least one additive selected from the group consisting of a salt, a weighting agent, an inert solid, a fluid loss control agent, an emulsifier, a dispersion aid, a corrosion inhibitor, an emulsion thinner, an emulsion thickener, a viscosifying agent, a gelling agent, a foaming agent, a lost circulation material, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, and any combination thereof.

Each of embodiments A and B may have one or more of the following additional elements in any combination:

Element 6: further comprising the step of introducing a pad fluid into the subterranean formation before introducing the treatment fluid, wherein introducing the pad fluid is at a pressure sufficient to create or extend at least one fracture in the subterranean formation.

Element 7: wherein the wellbore is at least one selected from the group consisting of a deviated wellbore, a highly deviated wellbore, a horizontal wellbore, and a hybrid wellbore.

Each of embodiments A and C may have one or more of the following additional elements in any combination:

Element 8: wherein the delayed-tackifier coated particulate is formed by at least one method selected from the group consisting of: dry-coating the particulate with the tackifier and the surfactant simultaneously; dry-coating the particulate with the tackifier and then wet-coating with the surfactant; wet-coating the particulate with the tackifier and the surfactant simultaneously; and, wet-coating the particulate with the tackifier and then wet-coating with the surfactant.

By way of non-limiting example, exemplary combinations applicable to A, B, or C include:

Combination 1: The method of A or B in combination with Element 7.

Combination 2: The method of A or B in combination with Elements 2 and 3.

Combination 3: The method of A or B in combination with Elements 2, 3, and 4.

Combination 4: The method of A or B in combination with Elements 3, and 4.

Combination 5: The method of A or B in combination with Element 7.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
providing a treatment fluid that comprises an aqueous base fluid and a delayed-tackifier coated particulate, the delayed-tackifier coated particulate comprising a particulate coated with a tackifier that is associated with a degradable surfactant that comprises at least one functional group selected from the group consisting of an ester, a phosphate ester, an acetal, a ketal, an orthoester, a carbonate, an anhydride, a silyl ether, an alkene oxide, an imine, an ether ester, an ester amide, an ester urethane, a carbonate urethane, an amino acid, any derivative thereof, and any combination thereof;
introducing the treatment fluid into a wellbore penetrating a subterranean formation; and,
forming a particulate pack within the subterranean formation, wherein the particulate pack is a gravel pack along a portion of the wellbore, a proppant pack within a portion of the subterranean formation, or both.

2. The method of claim 1 wherein the degradable surfactant comprises at least one selected from the group consisting of a cationic surfactant, a nonionic surfactant, and any combination thereof.

3. The method of claim 1 wherein the delayed-tackifier coated particulate is formed by at least one method selected from the group consisting of: dry-coating the particulate with the tackifier and the degradable surfactant simultaneously; dry-coating the particulate with the tackifier and then wet-coating the particulate with the degradable surfactant; wet-coating the particulate with the tackifier and the degradable surfactant simultaneously; and, wet-coating the particulate with the tackifier and then wet-coating the particulate with the degradable surfactant.

4. The method of claim 1 wherein the delayed-tackifier coated particulate is present in an amount ranging from about 0.25 pounds per gallon to about 30 pounds per gallon of the treatment fluid.

5. The method of claim 1 wherein the treatment fluid is foamed.

6. The method of claim 1 wherein the treatment fluid further comprises at least one additive selected from the group consisting of a salt, a weighting agent, an inert solid, a fluid loss control agent, an emulsifier, a dispersion aid, a corrosion inhibitor, an emulsion thinner, an emulsion thickener, a viscosifying agent, a gelling agent, a foaming agent, a lost circulation material, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, and any combination thereof.

7. The method of claim 1 further comprising:
introducing a pad fluid into the subterranean formation before introducing the treatment fluid, wherein introducing the pad fluid is at a pressure sufficient to create or extend at least one fracture in the subterranean formation.

8. The method of claim 1 further comprising:
producing hydrocarbons from the subterranean formation.

9. The method of claim 1 wherein the wellbore is at least one selected from the group consisting of a deviated wellbore, a highly deviated wellbore, a horizontal wellbore, and a hybrid wellbore.

10. The method of claim 1 further comprising:
activating the tackifier by degrading the degradable surfactant.

11. The method of claim 1 further comprising:
activating the tackifier by dissociating the degradable surfactant from the delayed-tackifier coated particulate.

12. A method comprising:
producing a delayed-tackifier coated particulate by dry-coating a particulate with a tackifier and a surfactant simultaneously;
producing a treatment fluid that comprises an aqueous base fluid and the delayed-tackifier coated particulate;
introducing the treatment fluid into a wellbore penetrating a subterranean formation; and
forming a particulate pack within the subterranean formation, wherein the particulate pack is a gravel pack along a portion of the wellbore, a proppant pack within a portion of the subterranean formation, or both.

13. The method of claim 12 wherein the wellbore is at least one selected from the group consisting of a deviated wellbore, a highly deviated wellbore, a horizontal wellbore, and a hybrid wellbore.

14. The method of claim 12 wherein the surfactant comprises at least one selected from the group consisting of a cationic surfactant, a nonionic surfactant, and any combination thereof.

15. The method of claim 12 wherein the surfactant comprises a degradable surfactant.

16. The method of claim 12 wherein the delayed-tackifier coated particulate is present in an amount ranging from about 0.25 pounds per gallon to about 30 pounds per gallon of the treatment fluid.

17. The method of claim 12 further comprising:
introducing a pad fluid into the subterranean formation before introducing the treatment fluid, wherein introducing the pad fluid is at a pressure sufficient to create or extend at least one fracture in the subterranean formation.

* * * * *